United States Patent
Cimini, Jr. et al.

(10) Patent No.: US 8,670,796 B2
(45) Date of Patent: *Mar. 11, 2014

(54) METHOD AND SYSTEM FOR REDUCTION OF PEAK-TO-AVERAGE POWER RATIO OF TRANSMISSION SIGNALS COMPRISING OVERLAPPING WAVEFORMS

(71) Applicant: AT&T Intellectual Property II, L.P., New York, NY (US)

(72) Inventors: Leonard Joseph Cimini, Jr., Howell, NJ (US); Nelson Ray Sollenberger, Saint Thomas, PA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,029

(22) Filed: Dec. 5, 2012

(65) Prior Publication Data

US 2013/0094602 A1 Apr. 18, 2013

Related U.S. Application Data

(63) Continuation of application No. 13/281,267, filed on Oct. 25, 2011, now Pat. No. 8,346,292, which is a continuation of application No. 12/605,264, filed on Oct. 23, 2009, now Pat. No. 8,064,853, which is a continuation of application No. 10/358,257, filed on Feb. 5, 2003, now Pat. No. 7,610,028, which is a continuation of application No. 09/324,487, filed on Jun. 2, 1999, now Pat. No. 6,556,557.

(51) Int. Cl.
*H04B 7/00* (2006.01)
*H04W 52/04* (2009.01)

(52) U.S. Cl.
USPC ........ 455/522; 455/69; 455/127.1; 455/67.11

(58) Field of Classification Search
USPC .......... 455/522, 69, 127.1, 67.11, 126, 115.1, 455/562, 277.1, 63.1, 452.2, 13.4; 370/208, 370/206, 252
See application file for complete search history.

(56) References Cited

U.S. PATENT DOCUMENTS

| | | | |
|---|---|---|---|
| 6,122,310 A | 9/2000 | Ziemer et al. | |
| 6,128,350 A | 10/2000 | Shastri et al. | |
| 6,222,873 B1 * | 4/2001 | Bang et al. | 375/146 |
| 6,236,864 B1 * | 5/2001 | McGowan et al. | 455/522 |
| 6,314,146 B1 * | 11/2001 | Tellado et al. | 375/346 |
| 6,556,557 B1 | 4/2003 | Cimini et al. | |
| 6,689,130 B2 | 2/2004 | Arai et al. | |
| 7,610,028 B2 | 10/2009 | Cimini, Jr. et al. | |
| 8,064,853 B2 * | 11/2011 | Cimini et al. | 455/126 |
| 8,346,292 B2 | 1/2013 | Cimini, Jr. et al. | |

* cited by examiner

*Primary Examiner* — John J Lee (57) ABSTRACT

The present invention provides a method and system for reducing the peak to average power ratio (PAP) of a signal with low computational complexity. According to one embodiment, the present invention is applied to reduce the PAP of an OFDM signal. According to an alternative embodiment, the present invention, is applied to reduce the PAP of a CDMA signal. Rather than seeking the optimum solution, which involves significant computational complexity, the present invention provides for a number of sub-optimal techniques for reducing the PAP of an OFDM signal but with much lower computational complexity.

18 Claims, 14 Drawing Sheets

FIG. 14   Performance of Walsh sequences.

METHOD AND SYSTEM FOR REDUCTION OF PEAK-TO-AVERAGE POWER RATIO OF TRANSMISSION SIGNALS COMPRISING OVERLAPPING WAVEFORMS

This application is a continuation of U.S. patent application Ser. No. 13/281,267 filed Oct. 25, 2011, which is currently allowed, and is a continuation of U.S. patent application Ser. No. 12/605,264 filed Oct. 23, 2009, (now U.S. Pat. No. 8,064,853), which is a continuation of U.S. patent application Ser. No. 10/358,257 filed Feb. 5, 2003, (now U.S. Pat. No. 7,610,028), which is a continuation of U.S. patent application Ser. No. 09/324,487 filed Jun. 2, 1999, (now U.S. Pat. No. 6,556,557). All of the aforementioned applications are herein incorporated by reference in their entirety.

FIELD OF THE INVENTION

The present invention relates to communication networks. In particular the present invention relates to a method and system for reducing the peak to average power ratio of wireless signals.

BACKGROUND INFORMATION

It is predicted that the 21st century will witness the widespread deployment of wireless networks that will revolutionize the concept of communication and information processing for business, professional and private applications. However, bandwidth scarcity and a hostile radio environment are among the two most significant technical hurdles for developing the next generation of wireless information systems. The latter issue is especially problematic in developing broadband wireless networks.

In particular, multipath delay spread resulting in intersymbol interference imposes an absolute limit on the bandwidth of a wireless channel. Orthogonal frequency division multiplexing (OFDM) is a very attractive technique for achieving high-bit-rate transmission in a radio environment. By dividing the total bandwidth into many narrow subchannels, each carrying a lower bit rate, which are transmitted in parallel, the effects of multipath delay spread can be minimized. Thus, the problem of intersymbol interference can be solved by increasing the symbol duration in the same ratio as the number of subchannels. This approach has been proposed or adopted for many wireless applications including digital audio broadcasting, digital terrestrial television broadcasting, wireless LANs and high-speed cellular data. Techniques for implementing OFDM are well known.

However, a significant disadvantage of employing OFDM for wireless applications is the potentially large peak-to-average power ratio (PAP) characteristic of a multi carrier signal with a large number of subchannels. In particular, a baseband OFDM signal with N subchannels has a PAP of $N^2/N=N$, for N=256, PAP=24 dB. When passed through a nonlinear device, such as a transmit power amplifier, the signal may suffer significant spectral spreading and in-band distortion. With the increased interest in OFDM for wireless applications, reducing the PAP is a necessity for implementing OFDM.

For wireless applications, efficient power amplification is required to provide adequate area coverage and to minimize battery consumption. The conventional solution to the PAP problem in OFDM systems is to use a linear amplifier that is operated with large backoff from its peak power limit. However, this approach results in a significant power penalty.

Several alternative solutions have been proposed to reduce the PAP. For example, one simple solution is to deliberately clip the OFDM signal before amplification, which provides a good PAP but at the expense of performance degradation. See R. O'Neill and L. N. Lopes, "Envelope Variations and Spectral Splatter in Clipped Multicarrier Signals," Proc. of PIMRC'99, pp. 71-75.

Another known conventional solution is nonlinear block coding, where the desired data sequence is embedded in a larger sequence and only a subset of all possible sequences are used, specifically those with low peak powers. See A. E. Jones, T. A. Wilkinson, and S. K. Barton, "Block Coding Scheme for Reduction of Peak to Mean Envelope Power Ratio of Multicarrier Transmission Scheme," Electron. Letts., Vol. 30, No. 25, December 1994, pp. 2098-2099. Using this nonlinear block coding approach, a 3-dB PAP can be achieved with only a small bandwidth penalty. However, the drawback of nonlinear block coding is that it requires large look-up tables at both the transmitter and receiver, limiting its usefulness to applications with only a small number of subchannels. There has been progress in developing coding schemes that reduce the PAP, can be implemented in systematic form, and have some error correcting capabilities. See A. E. Jones and T. A. Wilkinson, "Combined Coding for Error Control and Increased Robustness to System Nonlinearities in OFDM," Proc. of VTC'96, pp. 904-908. Nevertheless, these coding methods are difficult to extend to systems with more than a few subchannels and the coding gains are small for reasonable levels of redundancy.

Two promising techniques for improving the statistics of the PAP of an OFDM signal have been proposed. These techniques have been termed the selective mapping (SLM) approach and the partial transmit sequence (PTS) approach.

In selective mapping, M statistically independent sequences are generated from the same information and that sequence with the lowest PAP is chosen for transmission. To recover the data, the receiver must "know" which sequence has been used to "multiply" the data; this can be transmitted as side information.

In the PTS approach, each input data block consisting of a set of subcarrier coefficients is partitioned into disjoint subblocks, which are then combined to minimize the PAP. Specifically, each subcarrier coefficient is multiplied by a weighting coefficient, or phase factor. The phase factors are chosen to minimize the PAP of the transmitted signal.

Although both the selective mapping approach and the partial transmit sequence approach are useful for improving the statistics of the PAP of an OFDM signal, both introduce additional implementation complexity. In particular the SLM approach requires the use of M full-length (i.e., N-point) IFFTs (Inverse Fast Fourier Transforms) at the transmitter. The PTS approach requires a similar number of IFFT's and in addition introduces additional complexity due to the requirement of optimizing the assignment of phase factors to each partial transmit sequence. This computational complexity imposes limitations on battery life, particularly in the terminal unit. Thus, there is a need for a method to reduce the PAP of a signal that can be performed with low computational complexity.

Code Division Multiple Access (CDMA) is another very attractive technique for overcoming the bit rate limitations of the multi path channel. In addition, one of the approaches for achieving higher (as well as variable) bit rates consists of individual terminals transmitting multiple CDMA codes (multi-code CDMA). In both basic CDMA and multi-code CDMA, a similar PAP problem exists and a method for reducing the PAP of such a signal is desirable.

SUMMARY OF THE INVENTION

The present invention provides a method and system for reducing the PAP of a signal with low complexity compared to existing techniques. According to one embodiment, the present invention is applied to reduce the PAP of an OFDM signal. In an alternative embodiment, the present invention is applied to reduce the PAP of a CDMA signal. Rather than seeking the optimum solution, which involves significant computational complexity, the present invention provides for a number of sub-optimal techniques for reducing the PAP of an OFDM signal but with much lower computational complexity. In particular, according to one embodiment utilizing the PTS approach, an iterative technique is used to assign phase factors to each of a set of partial transmit sequences from a set of possible phase factors. Experimental results using the iterative technique showed only a slight degradation (1 dB) from the optimal approach using the same number of subblocks and subcarriers. In an alternative embodiment, which avoids feedback required by the iterative approach, a sequence of phase factors are generated randomly and assigned to each of a set of partial transmit sequences. This procedure is repeated for a pre-determined number of trials and the random sequence generating the lowest PAP is selected. In a third embodiment, a set of phase factors is generated using a structured sequence such as a Walsh sequence.

DETAILED DESCRIPTION

The techniques for performing OFDM transmission are well known. In OFDM transmission, a block of N symbols $\{X_n, n=0, 1, \ldots N-1\}$ is formed with each symbol modulating one of a set of N subcarriers $\{f_n, n=0, 1, \ldots N-1\}$. The N subcarriers are chosen to be orthogonal, i.e., $f_n = n \Delta f$, where the subcarrier spacing $\Delta f = 1/NT$ and where T is the original data symbol period. The original signal after digital-to-analog conversion can be expressed as:

$$x(t) = \sum_{n=0}^{N-1} X_n e^{2\pi f_n t}, \ 0 \leq t \leq NT \qquad (1)$$

An important advantage of OFDM is that, in sampled form equation (1) can be implemented using an Inverse Fast Fourier Transform (IFFT).

Figure 1:
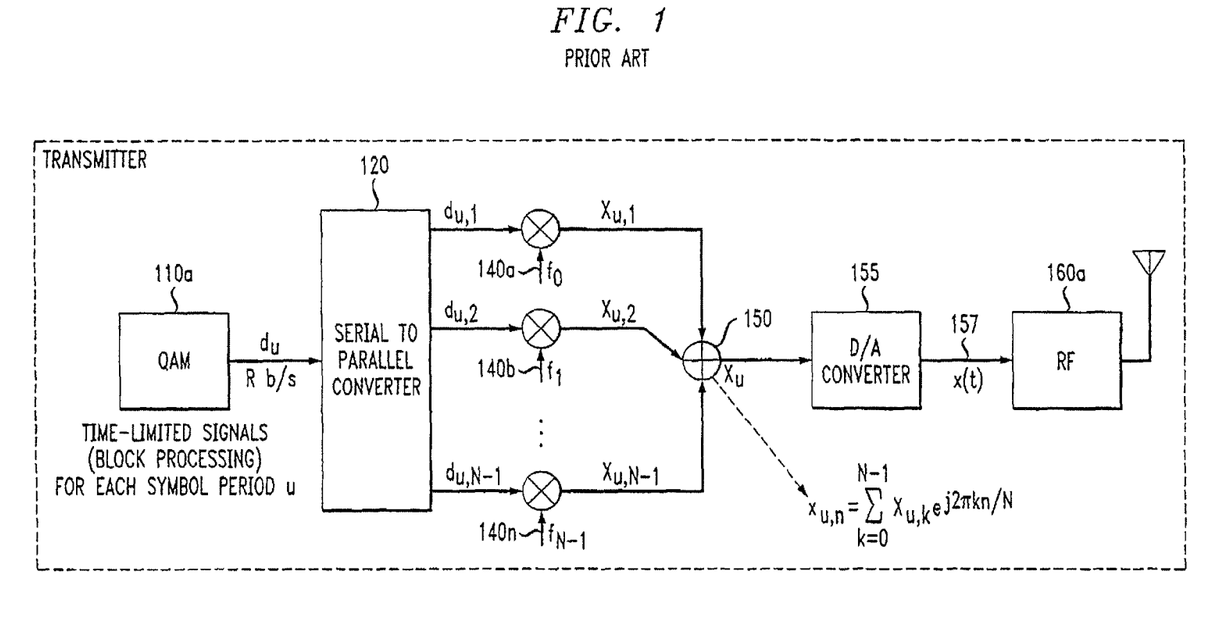
FIG. 1, which is prior art, is a block diagram that depicts an implementation of OFDM at a wireless transmitter.

FIG. 1, which is prior art, is a block diagram that depicts an implementation of OFDM at a wireless transmitter. A block of transmission data (corresponding to a particular symbol interval u) is digitally modulated in modulation block 110 using an appropriate modulation scheme such as quadrature amplitude modulation (QAM). A data vector output from modulation block 110a $d_u = \{d_{u,0}, \ldots, d_{u,N-1}\}$ is then mapped onto $f_N$ carriers (140a, 140b, etc.) via a serial to parallel converter block 120 to form a modulated sub carrier carrier vector $X_u = \{X_{u,0}, \ldots, Xu_{N-1}\}$. The subcarrier vector $X_u$ comprising all carrier amplitudes associated with OFDM symbol interval u is transformed into the time domain, using an N-point IDFT (Inverse Discrete Fourier Transform) (150) or IFFT producing time domain vector $x_u$. After digital to analog conversion (in D/A converter block 155), the continuous time signal x(t) (157) is transmitted over a wireless channel via RF block 160a.

Figure 2:
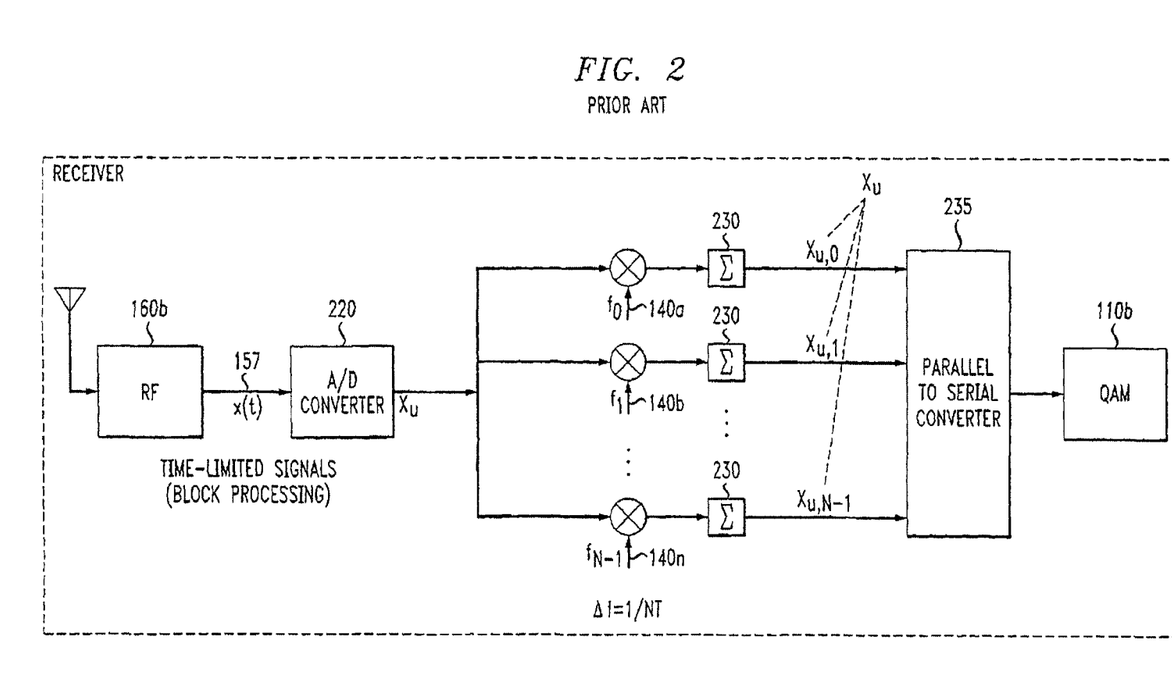
FIG. 2, which is prior art, is a block diagram that depicts an implementation of OFDM at a wireless receiver.

FIG. 2, which is prior art, is a block diagram that depicts an implementation of OFDM at a wireless receiver. A continuous time signal x(t) (157) is received via RF block 160b. The analog signal is converted to a digital signal via A/D converter 220 producing time domain vector $x_u$. The time domain vector $x_u$ is transformed to the frequency domain using an N-point DFT (Discrete Fourier Transform) (230) or FFT (Fast Fourier Transform), producing subcarrier vector $X_u$. After parallel to serial conversion in block 235, the signal is demodulated in QAM block 110b and the transmitted data recovered.

Figure 3:
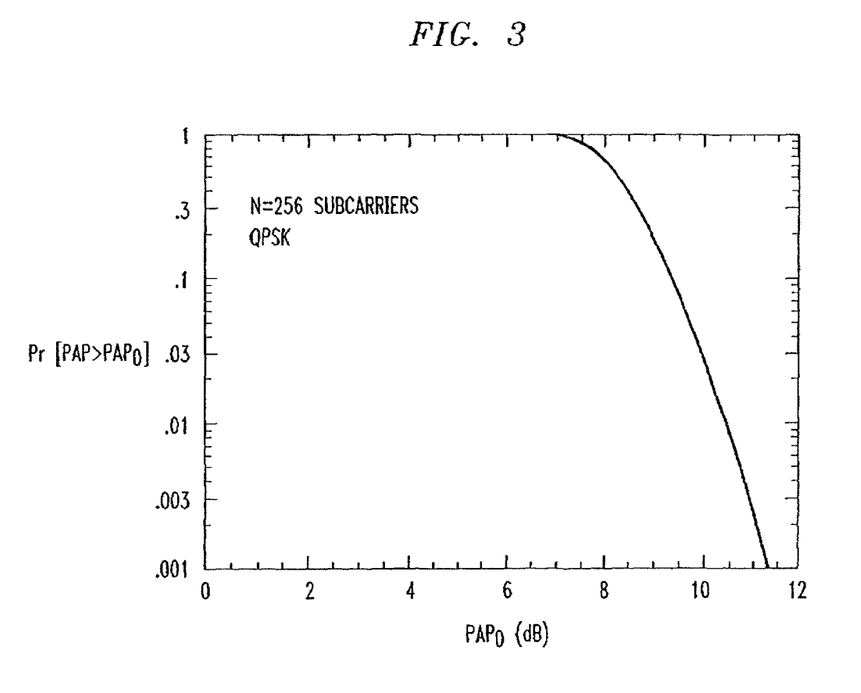
FIG. 3 is a graph showing the complementary cumulative distribution function (CCDF=PR(PAP>PAP$_0$) of the PAP of a continuous-time, analog, OFDM signal for the particular case of 256 subcarriers.

FIG. 3 is a graph showing the complementary cumulative distribution function (CCDF=PR(PAP>PAP$_0$)) of the PAP of continuous-time, analog, OFDM signal for the particular case of 256 subcarriers. The PAP of a transmitted signal is defined as:

$$PAP = \frac{\max |x(t)|^2}{E[x(t)^2]} \qquad (2)$$

To more accurately approximate the true PAP, the results of FIG. 3 were computed by oversampling (1) by a factor of four (e.g., by zero-padding the data input to the IFFT).

Figure 4:
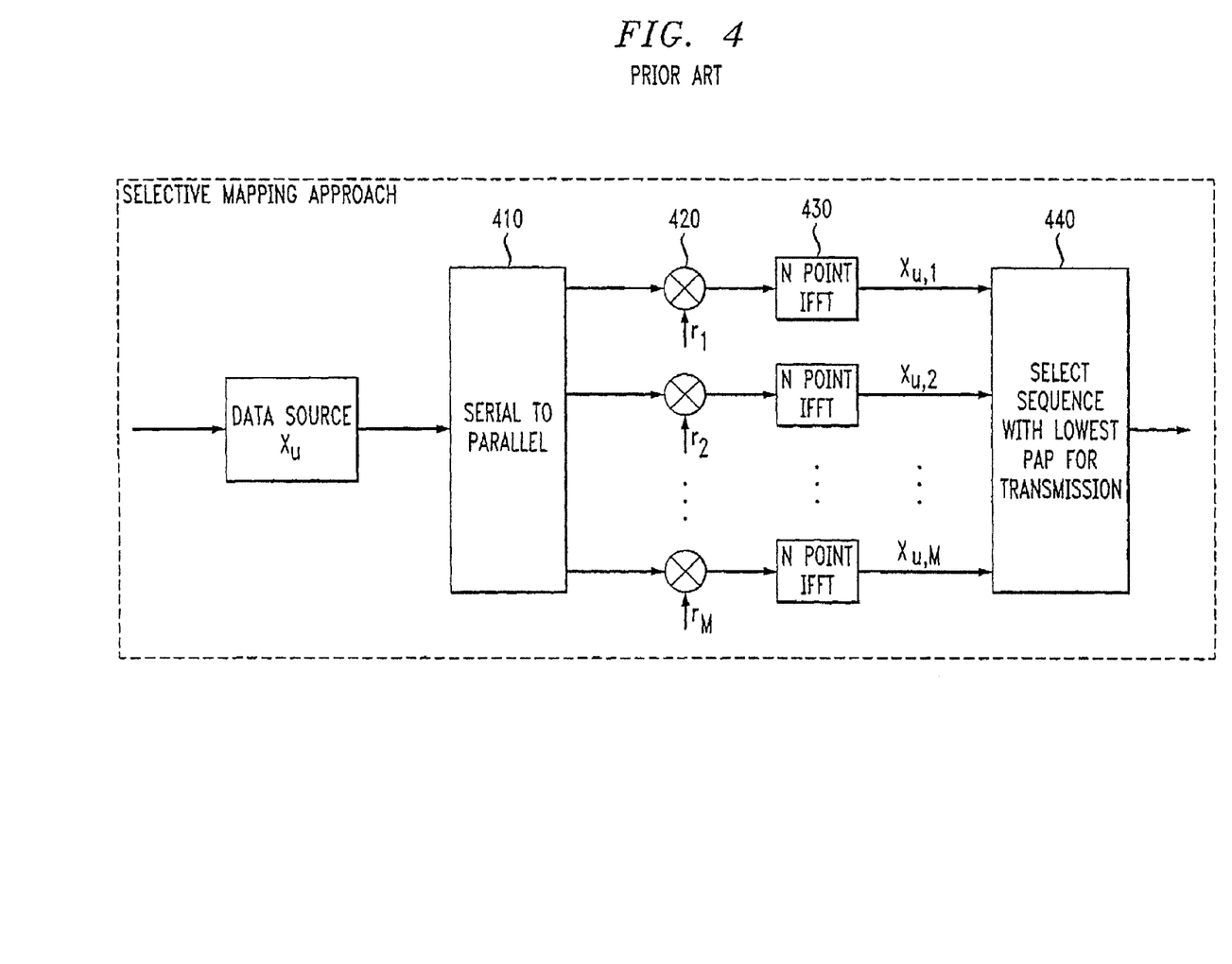
FIG. 4, which is prior art, is a block diagram depicting the SLM approach for reducing the PAP of an OFDM signal.

FIG. 4, which is prior art, is a block diagram depicting the SLM approach for reducing the PAP of an OFDM signal. Subcarrier vector $X_{u,is}$ multiplied by M random sequences $r_1$-$r_M$ (420). Each multiplied vector is transformed to a time domain vector using an IFFT (430). The PAP of each time domain vector $x_{u,1}$-$x_{u,M}$ is calculated and the sequence with the lowest PAP is selected for transmission (440).

Figure 5:
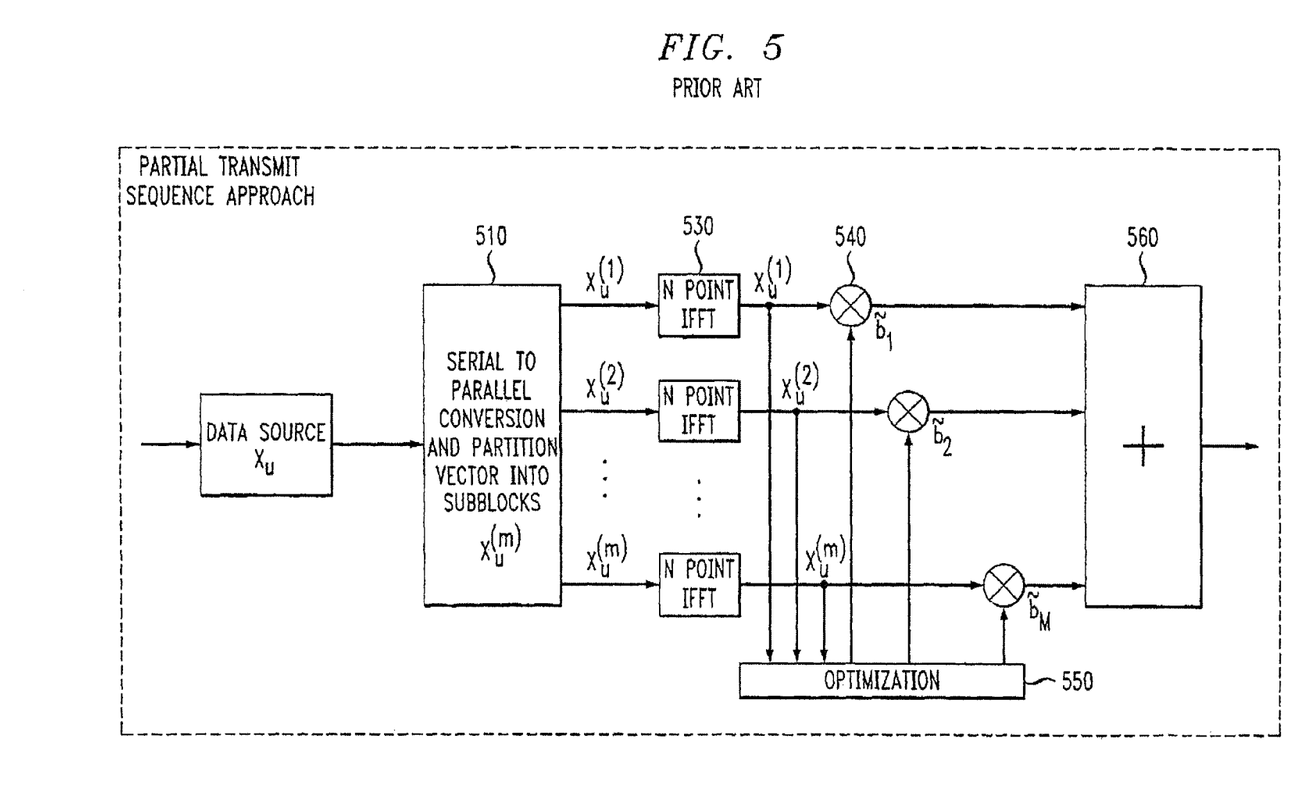
FIG. 5, which is prior art, is a block diagram depicting the PTS approach for reducing the PAP of an OFDM signal.

FIG. 5, which is prior art, is a block diagram depicting the PTS approach for reducing the PAP of an OFDM signal. Subcarrier vector $X_u$ is partitioned in M subblocks (510). Each of the M subblocks is transformed to a partial transmit sequence $x_{u,1}$-$x_{u,M}$ using an IFFT (530). A peak value optimization is then performed on the set of partial transmit sequences by appropriately assigning to each partial transmit sequence an appropriate phase factor b so that the PAP of the combined set of partial transmit sequences, each multiplied by its assigned phase factor 540, is minimized (550). The set of optimized phase factors is obtained by:

$$\{\tilde{b}_u^{(1)}, \ldots, \tilde{b}_u^{(M)}\} = \underset{\{\tilde{b}_u^{(1)}, \ldots, \tilde{b}_u^{(M)}\}}{\operatorname{argmin}} \left( \max_{0 \le k < N} \sum_{m=1}^{M} |b_u^m \cdot x_{u,k}^{(m)}| \right)$$

The partial transmit sequences, each multiplied by its assigned phase factor, are linearly combined 560 and transmitted.

In order to reconstruct the signal at the receiver, the receiver must have knowledge regarding the generation process of the transmitted OFDM signal (i.e., the chosen set of phase factors). The phase factors, therefore, are transmitted as side information resulting in some loss of efficiency. Alternatively, differential encoding can be employed across the subcarriers within a subblock; in this case, the overhead is a single subcarrier per subblock. Using 128 subcarriers with four subblocks and phase factors limited to the set $\{\pm 1, \pm j\}$, the 1% PAP can be reduced by more than 3 dB.

While the SLM and PTS approaches provide significantly improved PAP statistics for an OFDM transmit signal with little cost in efficiency, a significant issue in implementing these approaches is reducing the computational complexity. In particular, the SLM approach requires the use of M full-length (i.e., N-point) IFFTs at the transmitter. While the PTS approach requires a similar number of N-point IFFTs (one IFFT for each partial transmit sequence), computation complexity in computing these IFFTs is reduced by taking advantage of the fact that a large fraction of the input values are zero (in particular, only N/M values are non-zero). Nevertheless, in the PTS approach, an optimization is required at the transmitter in order to determine the best combination of the partial transmit sequences. In its most direct form, this process requires the PAP to be computed at every step of the optimization algorithm, necessitating numerous trials to achieve the optimum. It is known from C. Tellambura, "Phase Optimisation Criterion for Reducing Peak-to-Average Power Ratio in OFDM," *Electron. Letts.*, Vol. 34, No. 2, January 1998, pp. 169-170, that using an alternative performance criterion, less computations are necessary for each trial of the optimization algorithm.

Figure 6:
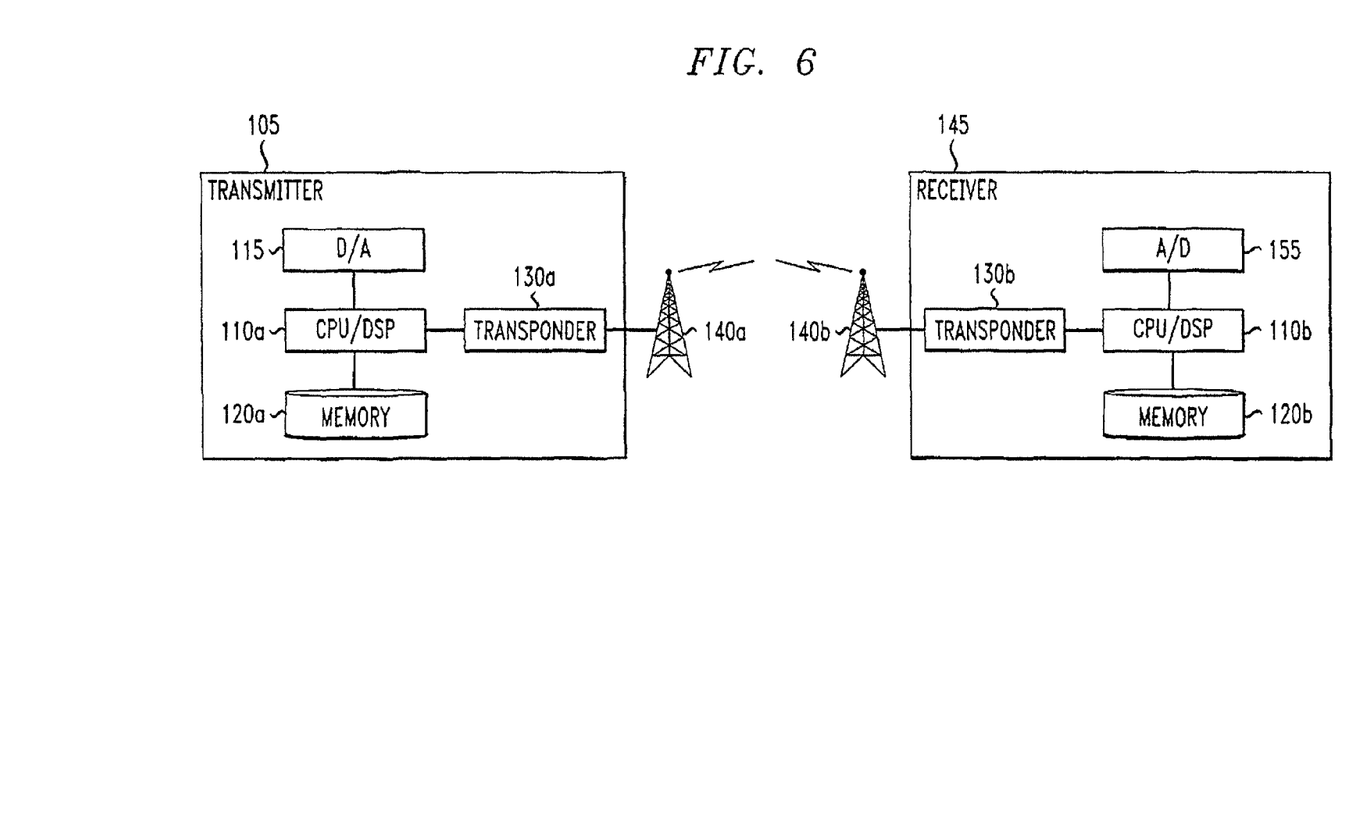
FIG. 6 is a block diagram depicting a wireless network architecture according to one embodiment of the present invention.

FIG. 6 is a block diagram depicting a wireless network architecture specifically adapted to reduce the PAP of signals transmitted through the network according to one embodiment of the present invention. The network depicted in FIG. 6 may be specifically adapted for the transmission of OFDM signals. In particular, transmitter 105 contains CPU/DSP 110*a*, which is specifically adapted either through specific hardware design or software components to perform operations upon digital (discrete time) signals to be transmitted through the wireless network. CPU/DSP 110*a* may also be an ASIC (Application Specific Integrated Circuit Device) specifically adapted to perform OFDM as well as other operations to reduce the PAP of an OFDM signal.

CPU/DSP 110*a* communicates with memory 120*a* in order to store data and program instructions. For example, CPU/DSP 110*a* may communicate with memory 120*a* to temporarily store intermediate results of DSP operations on signals to be transmitted through the wireless network. Transmitter 105 also contains digital to analog converter 115 for conversion of digital signals for wireless transmission to receiver via transponder 130*a* and antenna 140*a*.

Receiver 145 receives wireless signals via antenna 140*b* and transponder 130*b*. Analog signals received at receiver 145 are converted to digital format via analog to digital converter 155. Receiver 145 contains CPU/DSP 110*b* and memory 120*b* for performing operations on received digital signals. In particular, according to one embodiment, CPU/DSP 110*b* is specifically adapted to perform demultiplexing of OFDM signals as well as other operations to reconstruct the original signals sent by transmitter 105.

Figure 7:
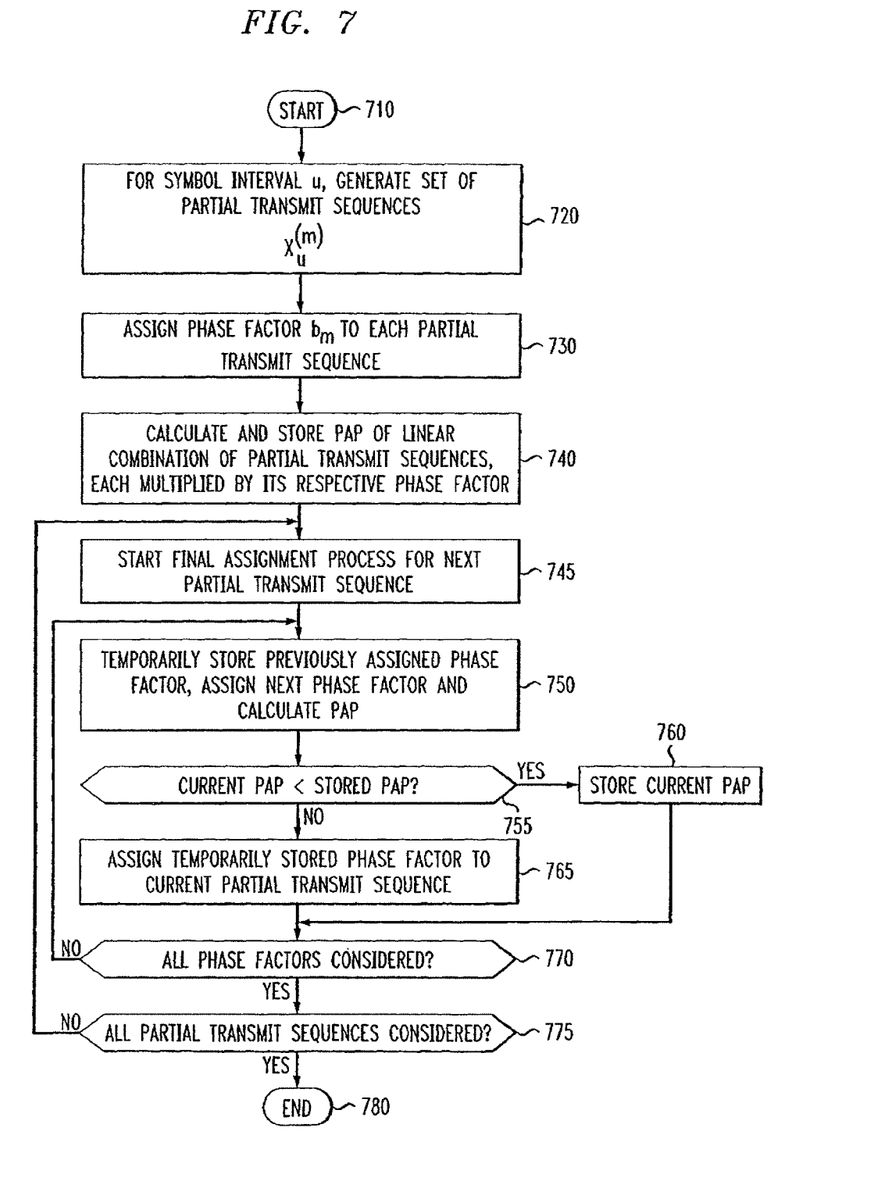
FIG. 7 is a flowchart depicting the steps of an iterative algorithm utilizing partial transmit sequences for reducing the PAP of an OFDM signal.

In the PTS approach, a major portion of the computational complexity originates from the need to optimize the phase factors used for combining the subblocks. FIG. 7 is a flowchart depicting the steps of a sub-optimal iterative process for reducing the PAP of an OFDM signal. The procedure is initiated in step 710. In step 720 a set of partial transmit sequences are generated for a particular signal interval u. For example, this may be accomplished by segmenting a subcarrier vector $X_u$ into M subblocks. Then an IFFT is performed on each subblock to produce each partial transmit sequence. In step 730 an initial phase factor $b_m$ from a set of possible phase factors is assigned to each partial transmit sequence. In step 740 the PAP value of a linear combination of the partial transmit sequences, each multiplied by its respective phase factor, is calculated and stored in memory 120*a*.

In step 745 each partial transmit sequence is analyzed and assigned a final phase factor according to steps 750-765. In particular, in step 750 the current phase factor assigned to the partial transmit sequence under consideration is stored in memory. Then a phase factor from the set of possible phase factors is assigned to the current partial transmit. The PAP value of the linear combination of the partial transmit sequences each multiplied by its respective phase factor is then calculated. In step 755, this calculated PAP value is compared with the PAP value stored in memory. If the calculated PAP value is lower than the PAP value stored in memory ('yes' branch of step 755), the current PAP value is stored (step 760) and the partial transmit sequence under consideration retains the assigned phase factor. Otherwise, if the current PAP value is greater than the stored PAP value ('no' branch of step 755), the temporarily stored phase factor from step 750 is re-assigned to the current partial transmit sequence (step 765). In step 770, it is determined whether all phase factors from the set of possible phase factors have been examined for the current partial transmit sequence. If not, ('no' branch of step 770), step 750 is executed again. If all phase factors have been examined ('yes' branch of step 770), in step 775 it is determined whether all partial transmit sequences have been examined and assigned a final phase factor. If not ('no' branch of step 775), step 745 is executed again. If all partial transmit sequences have been examined and assigned a final phase factor, the procedure ends (step 780).

The following pseudo-code defines an embodiment of the present invention:

```
Steps:
#define SIZE_OF_PARTIAL_TRANSMIT_SEQUENCE 5
#define NUMBER_OF_PHASE_FACTORS 2
int phase_factors[2]= {-1,1};
int best_PAP;
Struct PTS
{
int[SIZE_OF_PARTIAL_TRANSMIT_SEQUENCE];
int phase_factor;
}
{
assign initial phase factor to each partial transmit sequence;
best_PAP=PAP of combine set of partial transmit sequences each
multiplied by its corresponding phase factor;
for each partial transmit sequence do{
        for (i=0;i<=NUMBER_OF_PHASE_FACTORS-1; i++)
        {
        temp_phase_factor=partial_transmit_sequence.phase_factor;
        partial_transmit_sequence.phase_factor=phase_factors[i];
        current_PAP=PAP of combined set of partial transmit
sequences each multiplied by its corresponding phase factor;
            if current_PAP<best_PAP
            best_PAP=current_PAP;
            else
            partial_transmit_sequence.phase_factor=temp_phase_factor;
}
```

According to one embodiment of the present invention, the set of possible phase factors can take on only binary values from the set {1, −1}. Using this example, after dividing the input data block into M subblocks, M N-point PTSs are generated using an IFFT. Each partial transmit sequence is assigned the same phase factor, (i.e., $b_m$=1 for all m). The PAP of the combined signal is then computed. The first phase factor $b_1$ is then inverted and the PAP is then recomputed. If the new PAP is lower than in the previous step, $b_1$ is retained as part of the final phase sequence. Otherwise $b_1$ is reassigned its previous value. This procedure continues in a sequential fashion until all of the M possibilities for "flipping" the signs of the phase factors have been explored.

Results of the sub-optimal iterative approach (as discussed below) show a significant improvement in the PAP of an OFDM signal with only a small degradation compared to the optimum. Nevertheless, the iterative approach requires some feedback for implementation. An alternative approach, which avoids feedback, is to approximate the optimum by simply multiplying the desired information sequence by a number of random sequences and choosing the best to transmit.

Figure 8:
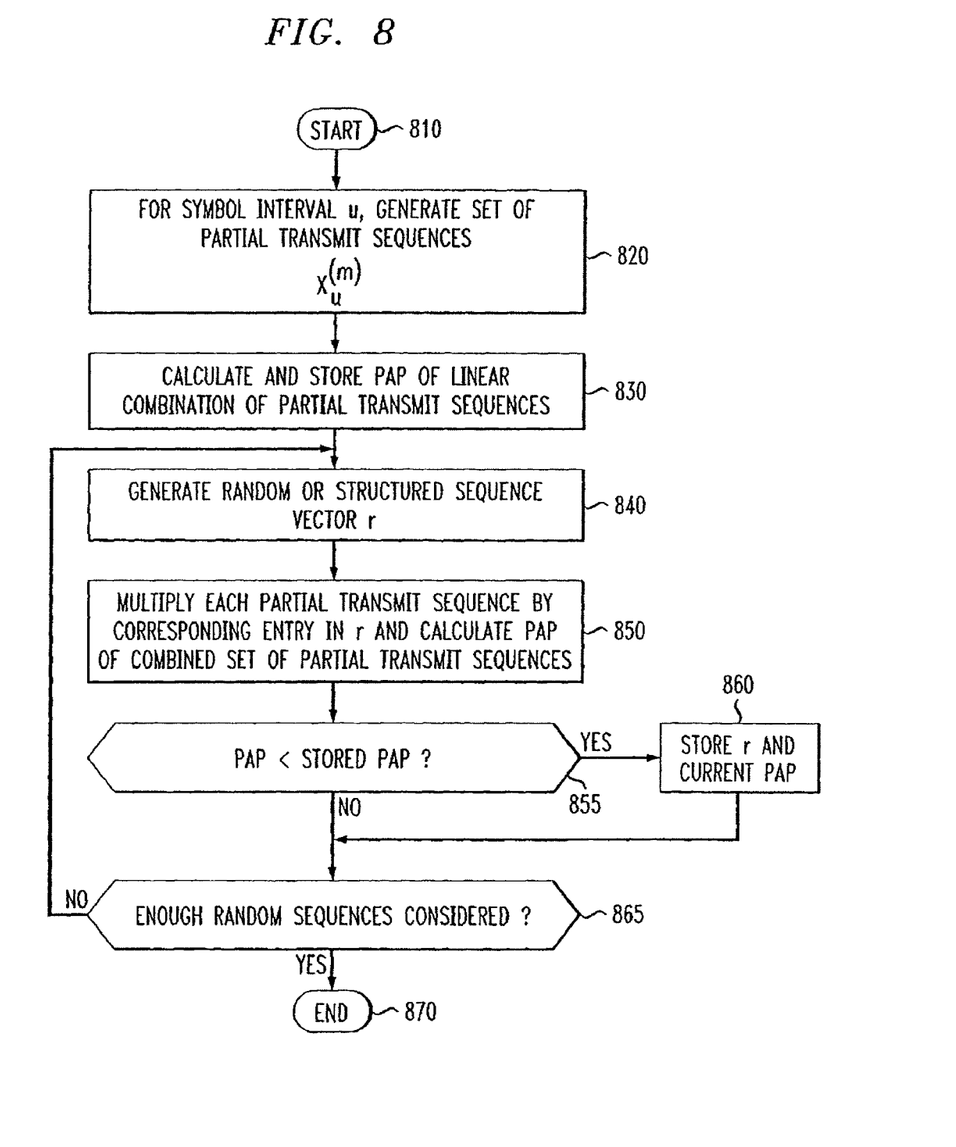
FIG. 8 is a flowchart depicting the steps of an algorithm for reducing the PAP of an OFDM signal using randomly generated sequences of phase factors or structured sequences according to one embodiment of the present invention.

FIG. 8 is a flowchart depicting the steps of a sub-optimal technique using random sequences of random phase factors for reducing the PAP of an OFDM signal according to one embodiment of the present invention. In step 810 the procedure is initiated. In step 820, for the symbol interval u, a set of partial transmit sequences is generated (i.e., see discussion of step 720 in FIG. 7). In step 830 a PAP value of a linear combination of the partial transmit sequences is calculated and stored in memory 120a. In step 840, a vector of random phase factors r is generated. In step 850, the PAP value of the combined partial transmit sequences each multiplied by a corresponding phase factor in r is calculated. If the PAP value using the current vector r is lower than the stored PAP value ('yes' branch of step 855), the vector r and the current PAP value are stored (step 860). Otherwise ('no' branch of step 855), it is determined whether a sufficient number of random sequences have been considered (i.e., the number of random sequences is user determined). If a pre-determined number of sequences have not been considered ('no' branch of step 865), step 840 is executed again and another random vector is generated. Otherwise, the procedure ends in step 870 and the currently stored vector r is used for transmission.

According to simulation results (discussed in more detail below), it was found that 16 random trials produced statistically the same results as the iterative approach described above. Based upon this observation, according to an alternative embodiment of the present invention, a known set of sequences, which are easily generated, were used instead of random sequences. According to one embodiment, for example, Walsh sequences were used. Walsh functions reduce the number of required additions by a large factor if partial sums are stored. This is similar to the way a FFT reduces the computations required for a DFT. Using structured sequences such as Walsh sequences resulted in degradation of only 0.3 dB. Similar results can be obtained with other well-known sequences such as the Shapiro-Rudin sequences.

Simulation Parameters

The PAP is associated with the continuous-time OFDM transmit signal. Many experimental results compute the PAP based on T or symbol-sampled data in which case overly-optimistic results are produced due to missing peaks in the signal. Simulations, with regard to the present invention, were conducted in which the transmitted symbol was oversampled by a factor of four. Simulations showed that this oversampling was sufficient to capture signal peaks. In the results, described below, 100000 random OFDM blocks were generated to obtain CCDF plots. 256 subcarriers were used as were QPSK data symbols.

Simulation Results

Figure 9:
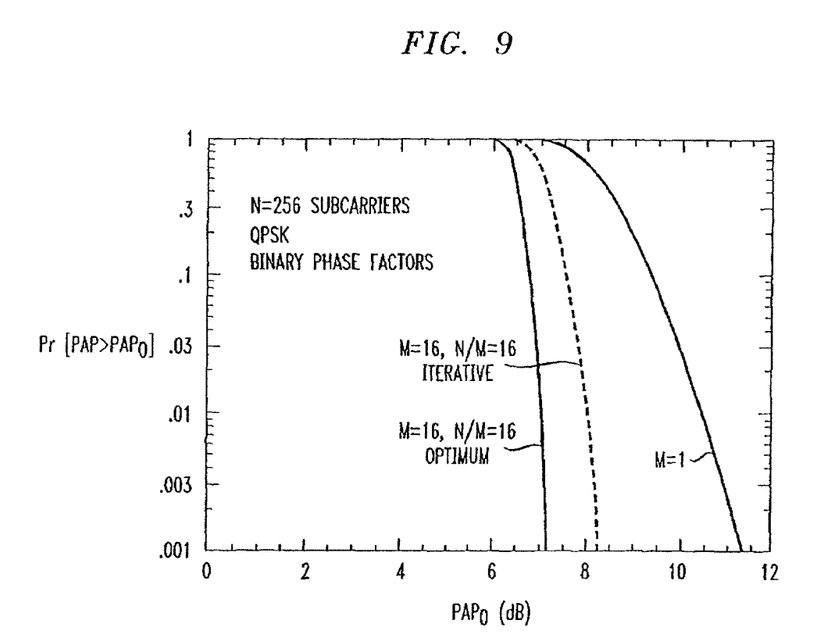
FIG. 9 shows a comparison of CCDF plots utilizing the iterative approach of the present invention and the optimum approach.

FIG. 9 shows a comparison of CCDF plots utilizing the iterative approach of the present invention and the optimum approach for the case of a single OFDM block and 16 subblocks each composed of 16 subcarriers. The unmodified OFDM signal exhibits a PAP which exceeds 10.4 dB for less than 1% of the blocks. By using the PTS approach with the optimum binary phase sequence for combining, the 1% PAP can be reduced to 6.8 dB. In addition, the slope is improved so that the reduction in the PAP would be even more significant at lower values of the CCDF. Using the iterative technique, a value of 7.8 dB was obtained. While this represents a degradation of 1 dB, the optimization process is reduced to 16 set of 16 additions, a considerable savings over attempting to find the optimum set of phase factors (the PAP is actually computed 17 times, including the case where $b_m$=1 for all m).

Figure 10:
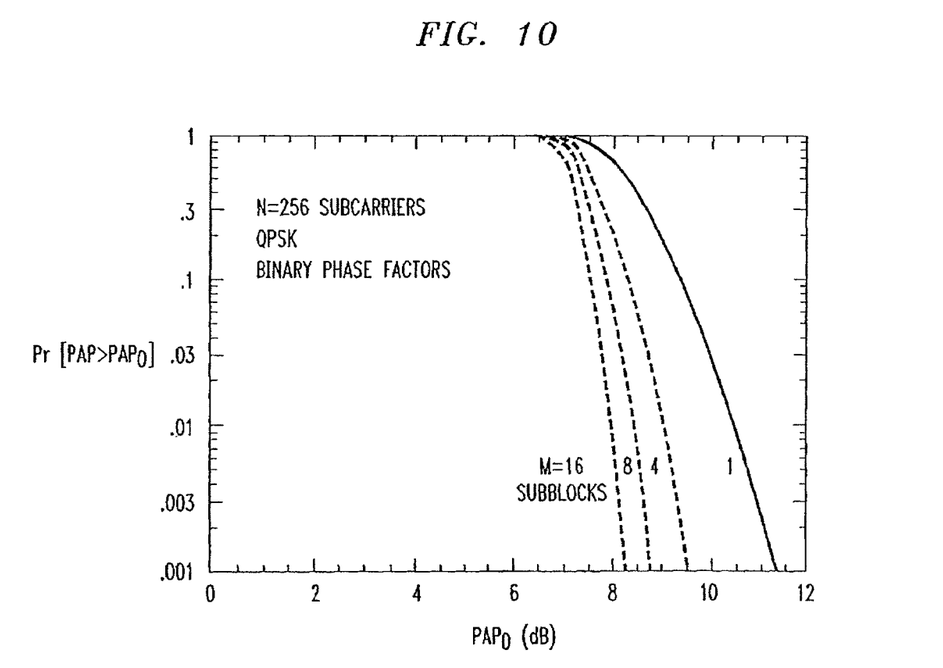
FIG. 10 shows a comparison of CCDF plots for the iterative technique demonstrating the effect of varying the number of subblocks.

FIG. 10 shows CCDF plots for the iterative technique demonstrating the effect of varying the number of subblocks. FIG. 10 shows CCDF plots using the iterative technique for 4, 8 and 16 subblocks, each increase in the number of subblocks impacting the complexity of the implementation. As expected, the improvement decreases as the number of subblocks decreases. However, FIG. 10 shows that with only 8 subblocks, and therefore, only 8 additional steps in the optimization, a reduction of more than 2 dB in the 1% PAP was achieved.

Figure 11:
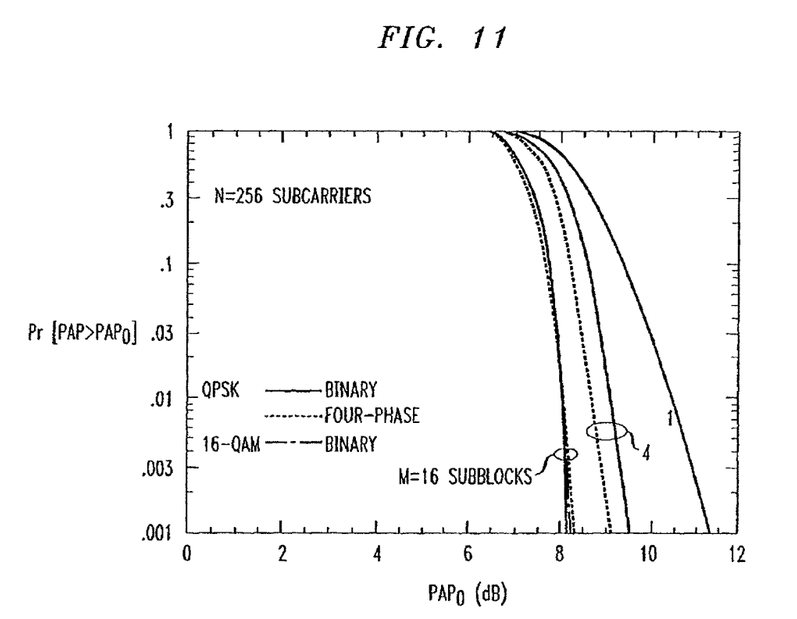
FIG. 11 shows a comparison of CCDP plots for the iterative technique demonstrating the effect of four-phase weighting factors and 16 QAM signal constellations.

FIG. 11 shows CCDF plots for the iterative technique demonstrating the effects of allowing the phase factors to be chosen from the set {±1, ±j} instead of the binary set {−1, 1}. As shown in FIG. 11, for 16 subblocks the effect is small. With only 16 steps, the additional degrees of freedom were not enough to offset the increased possibility of encountering a poor sequence. For a smaller number of subblocks, the added degree of freedom in choosing the phase factors provided only an addition 0.4 dB reduction. Also, the results showed that using a 16-QAM constellation to modulate each subcarrier resulted in negligible differences from the QPSK (Quadrature Phase Shift Keying) case.

OFDM has been proposed for use in many applications, including multiple-user or multiple-access modes. For such an application, the base station transmits a block of N subchannels in which only a small subset of the subchannels are intended for an individual mobile or portable receiver. In this case, the signals to be transmitted (e.g., 16 subcarriers for each of the 16 users) are combined and transmitted over one antenna at the base station. However, each of the user-clusters is transmitted with a different power level, usually depending on the distance from the base to the individual portable receiver. Given the use of power control, it is necessary to assess its effect on the PAP when the iterative technique is used.

Figure 12:
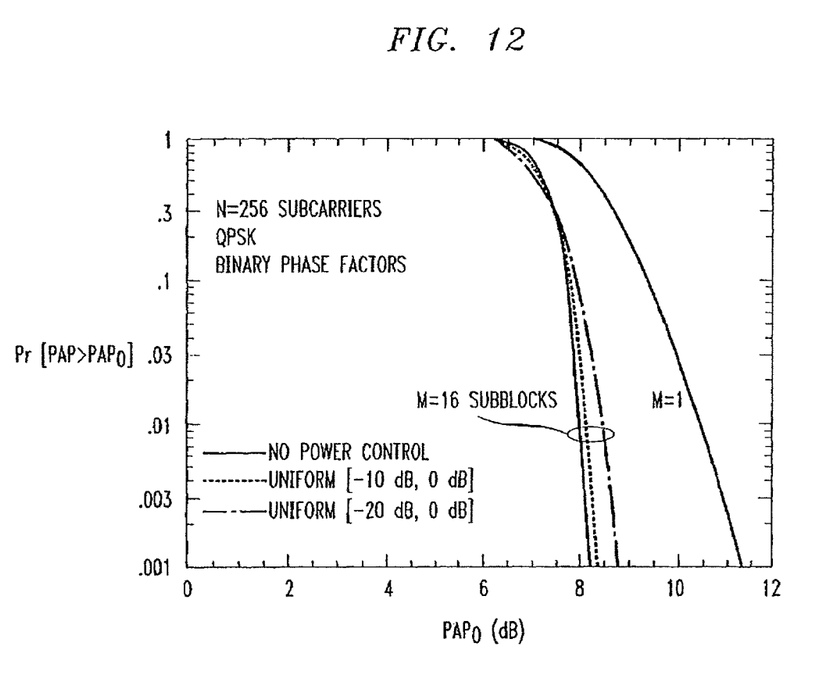
FIG. 12 shows a comparison of CCDP plots for the iterative technique demonstrating the effects of the use of power control.

FIG. 12 shows CCDF plots for the iterative technique demonstrating the effect of no power control, power control with the transmit levels chosen uniformly in the interval [−10 dB, 0 dB] and power control in which the transmit levels are chosen from a distribution with a wider spread [−20 dB, 0 dB]. As shown from the plots of FIG. 12, the additional variations in transmitter power in each subblock resulted in very little degradation for the 10-dB spread case and about 0.5 dB for the 20 dB case. These results depict a worst-case scenario. In more realistic scenarios the distribution would not be uniform and the degradation would be minimal.

Figure 13:
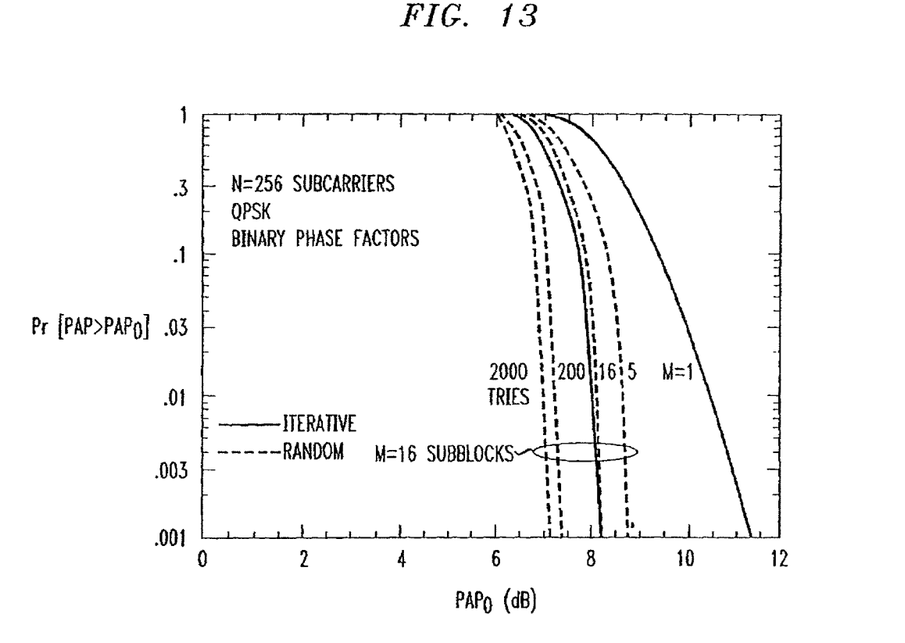
FIG. 13 shows a comparison of CCDP plots for the iterative technique and the use of random sequences.

FIG. 13 shows a comparison of CCDF plots for the iterative technique and the use of random sequences. FIG. 13 shows results using 5, 16,200 and 2000 random phase sequences (each of length M). Note that 2000 tries results in performance, which is essentially equal to the global optimum. However, even using as few as 5 random tries, it is possible to obtain results within 1.5 dB of the optimum.

Figure 14:
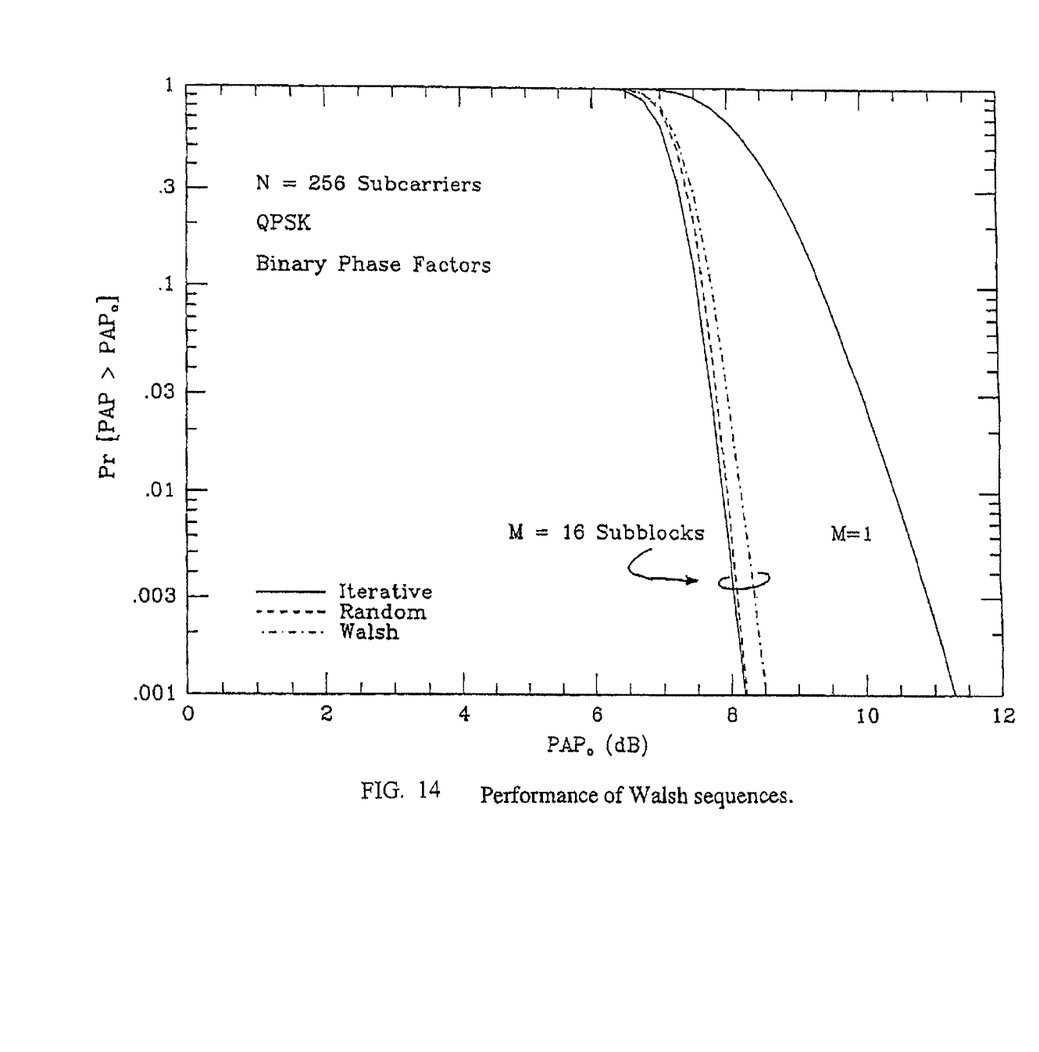
FIG. 14 shows a comparison of CCDF plots for the use of iterative technique, random sequences and Walsh sequences.

FIG. 14 shows a comparison of CCDF plots for the use of iterative technique, random sequences and Walsh sequences. FIG. 14 shows results when the 16 Walsh sequences of length 16 are used. These sequences result in a degradation of only 0.03 dB.

What is claimed is:

1. A method for minimizing a first peak to average power ratio value, comprising:
calculating, by a processor, the first peak to average power ratio value of a combined signal comprising a combination of: each of a plurality of vectors associated with a signal being multiplied by a corresponding phase factor assigned to each of the plurality of vectors, wherein the phase factor comprises a binary value; and
assigning, by the processor, a final phase factor to each of the plurality of vectors, wherein the final phase factor is assigned on a basis that the first peak to average power ratio value of the combined signal will be minimized.

2. The method of claim 1, wherein the signal is an orthogonal frequency division multiplexed signal.

3. The method of claim 1, wherein the signal is a wireless signal transmitted using code division multiple access.

4. The method of claim 1, wherein the signal is a wireless signal transmitted using multicode code division multiple access.

5. The method of claim 1, wherein the plurality of vectors comprises partial transmit sequences.

6. The method of claim 1, wherein the binary value comprises either a 1 value or a −1 value.

7. A transmitter, comprising:
a transponder device;
a memory; and
a processor coupled to the memory and the transponder device, the processor for:
calculating a first peak to average power ratio value of a combined signal comprising a combination of: each of a plurality of vectors associated with a signal being multiplied by a corresponding phase factor assigned to each of the plurality of vectors, wherein the phase factor comprises a binary value; and
assigning a final phase factor to each of the plurality of vectors, wherein the final phase factor is assigned on a basis that the first peak to average power ratio value of the combined signal will be minimized.

8. The transmitter of claim 7, wherein the signal is an orthogonal frequency division multiplexed signal.

9. The transmitter of claim 7, wherein the signal is a wireless signal transmitted using code division multiple access.

10. The transmitter of claim 7, wherein the signal is a wireless signal transmitted using multicode code division multiple access.

11. The transmitter of claim 7, wherein the plurality of vectors comprises partial transmit sequences.

12. The transmitter of claim 7, wherein the binary value comprises either a 1 value or a −1 value.

13. An apparatus for minimizing a first peak to average power ratio value comprising:
a processor
and a memory, the processor and the memory for performing operations, the operations comprising:
calculating the first peak to average power ratio value of a combined signal comprising a combination of: each of a plurality of vectors associated with a signal being multiplied by a corresponding phase factor assigned to each of the plurality of vectors, wherein the phase factor comprises a binary value; and
assigning a final phase factor to each of the plurality of vectors, wherein the final phase factor is assigned on a basis that the first peak to average power ratio value of the combined signal will be minimized.

14. The apparatus of claim 13, wherein the signal is an orthogonal frequency division multiplexed signal.

15. The apparatus of claim 13, wherein the signal is a wireless signal transmitted using code division multiple access.

16. The apparatus of claim 13, wherein the signal is a wireless signal transmitted using multicode code division multiple access.

17. The apparatus of claim 13, wherein the plurality of vectors comprises partial transmit sequences.

18. The apparatus of claim 13, wherein the binary value comprises either a 1 value or a −1 value.

* * * * *